(12) United States Patent
Sugihira et al.

(10) Patent No.: US 10,876,483 B2
(45) Date of Patent: Dec. 29, 2020

(54) CONTROL DEVICE FOR INTERNAL COMBUSTION ENGINE

(71) Applicant: TOYOTA JIDOSHA KABUSHIKI KAISHA, Toyota (JP)

(72) Inventors: Shigehiro Sugihira, Susono (JP); Noriyasu Adachi, Numazu (JP); Keisuke Sasaki, Susono (JP); Takayoshi Kawai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 16/199,415

(22) Filed: Nov. 26, 2018

(65) Prior Publication Data

US 2019/0226412 A1 Jul. 25, 2019

(30) Foreign Application Priority Data

Jan. 25, 2018 (JP) ................................. 2018-010740

(51) Int. Cl.
*F02D 41/00* (2006.01)
*F02D 41/14* (2006.01)
(Continued)

(52) U.S. Cl.
CPC ....... *F02D 41/0007* (2013.01); *F01D 17/105* (2013.01); *F01L 1/04* (2013.01); *F02C 7/057* (2013.01); *F02D 41/0002* (2013.01); *F02D 41/1497* (2013.01); *F01L 13/0036* (2013.01); *F02D 41/18* (2013.01);
(Continued)

(58) Field of Classification Search
CPC ............. F02D 41/0007; F02D 41/0002; F02D 41/1497; F02D 41/18; F02D 2041/0001; F02D 2041/0002; F02D 2200/0402; F02D 2200/0406; F02D 2200/703;
(Continued)

(56) References Cited

U.S. PATENT DOCUMENTS 5,187,935 A * 2/1993 Akiyama ............ F02D 41/0007
60/600
6,745,743 B2 * 6/2004 Abo .................... F02D 41/1498
123/295
(Continued)

FOREIGN PATENT DOCUMENTS

JP 2016-89749 5/2016

*Primary Examiner* — Thai Ba Trieu
(74) *Attorney, Agent, or Firm* — Oblon, McClelland, Maier & Neustadt, L.L.P.

(57) ABSTRACT

A control device for an internal combustion engine is configured, where a designated cam switching condition is met, to execute a boost pressure control processing and an air amount control processing. In the boost pressure control processing, the control device controls a boost pressure control device such that a boost pressure control parameter does not increase in synchronization with execution of a cam switching operation and decreases in accordance with an increase of a required engine torque after the execution of the cam switching operation. In the air amount control processing, the control device controls the opening degree of a throttle valve to its closed side in synchronization with the cam switching operation such that a difference of an in-cylinder charge air amount is not produced before and after the execution of the cam switching operation.

4 Claims, 7 Drawing Sheets

(51) Int. Cl.
*F02D 41/18* (2006.01)
*F02C 7/057* (2006.01)
*F01D 17/10* (2006.01)
*F01L 1/04* (2006.01)
*F01L 13/00* (2006.01)

(52) U.S. Cl.
CPC .. *F02D 2041/001* (2013.01); *F02D 2041/002* (2013.01); *F02D 2200/0402* (2013.01); *F02D 2200/0406* (2013.01); *F02D 2200/703* (2013.01); *F02D 2250/21* (2013.01); *F02D 2250/31* (2013.01); *F05D 2220/40* (2013.01)

(58) Field of Classification Search
CPC ............ F02D 2250/21; F02D 2250/31; F05D 2220/40; F01L 1/04; F01L 13/0036; F02C 7/057
USPC .................... 60/602, 600; 123/90.18
See application file for complete search history.

(56) References Cited

U.S. PATENT DOCUMENTS

| | | | | |
|---|---|---|---|---|
| 6,840,237 | B2* | 1/2005 | Strom | F02D 41/0007 |
| | | | | 123/679 |
| 7,191,589 | B2* | 3/2007 | Yasui | F02D 41/0002 |
| | | | | 123/90.15 |
| 7,295,912 | B2* | 11/2007 | Yasui | F02D 41/0002 |
| | | | | 701/103 |
| 7,404,383 | B2* | 7/2008 | Elendt | F01L 13/0036 |
| | | | | 123/90.18 |
| 9,605,603 | B2* | 3/2017 | Glugla | F01L 13/0036 |
| 2006/0027208 | A1* | 2/2006 | Pinkston | F01L 13/0036 |
| | | | | 123/90.18 |
| 2014/0303873 | A1* | 10/2014 | Glugla | F01L 13/0036 |
| | | | | 701/103 |

* cited by examiner

CONTROL DEVICE FOR INTERNAL COMBUSTION ENGINE

CROSS-REFERENCE TO RELATED APPLICATION

This application is based on and claims the benefit of Japanese Patent Application No. 2018-010740, filed on Jan. 25, 2018, which is incorporated by reference herein in its entirety.

BACKGROUND

Technical Field

The present disclosure relates to a control device for an internal combustion engine.

Background Art

For example, JP 2016-089749 A discloses a control device for an internal combustion engine provided with a turbocharger. This internal combustion engine is equipped with a cam switching device capable of switching, between a large lift cam and a small lift cam, a cam that drives an intake valve.

The control device described above executes a cam switching operation from the large lift cam to the small lift cam when a request to shift to a low-load region that falls below a misfire lower limit load is made in an engine operating state in which the large lift cam is used and introduction of EGR gas is performed. The start timing of this cam switching operation is controlled, on the basis of a time required for the load of the internal combustion engine to reach the misfire lower limit load and a time required for the cam switching operation, such that the cam switching operation is completed at a time point at which the load of the internal combustion engine reaches the misfire lower limit load.

SUMMARY

As disclosed in JP 2016-089749 A, an internal combustion engine equipped with a boost pressure control device in addition to a cam switching device, a turbocharger and a throttle valve arranged downstream of a compressor of the turbocharger is known. The cam switching device mentioned here can switch, between a first cam and a second cam selected to achieve a charging efficiency of intake air that is higher than a charging efficiency achieved with the first cam, a cam (i.e., valve drive cam) that drives a valve that opens and closes a combustion chamber (i.e., at least one of an intake valve and an exhaust valve). Moreover, the boost pressure control device (for example, a device including a waste gate valve) can control the boost pressure (i.e., throttle-upstream pressure) by adjusting the amount of exhaust energy recovered by a turbine.

According to the internal combustion engine having the configuration described above, a designated cam switching condition that a cam switching operation from the first cam to the second cam is performed in response to an increase of a required engine torque may be met during use of a high-load region in which the throttle-downstream pressure is higher than the atmospheric air pressure. In order to reduce a torque difference due to occurrence of a difference of the in-cylinder charge air amount before and after the execution of this kind of cam switching operation, it is conceivable to lower the boost pressure by the boost pressure control device to lower the throttle-downstream pressure.

However, if the boost pressure control device is controlled as described above, there is a concern that a delay in the follow-up of an actual engine torque with respect to the required engine torque may be produced when the in-cylinder charge air amount is caused to increase while increasing the boost pressure in response to an increase of the required engine torque after the execution of the cam switching operation. Also, this kind of delay in the follow-up of the actual engine torque may lead to shortage of the engine torque.

The present disclosure has been made to address the problem described above, and an object of the present disclosure is to provide a control device for an internal combustion engine that can reduce shortage of engine torque after execution of a cam switching operation while reducing the occurrence of a difference of in-cylinder charge air amount (torque difference) before and after the execution of the cam switching operation.

A control device for controlling an internal combustion engine according to the present disclosure is configured to control an internal combustion engine that includes:

a turbocharger equipped with a compressor arranged in an intake air passage and a turbine arranged in an exhaust gas passage;

a throttle valve arranged in a portion of the intake air passage located on an upstream side of the compressor;

a boost pressure control device configured to control a boost pressure of the turbocharger by changing a boost pressure control parameter whose value is made smaller when an amount of exhaust energy recovered by the turbine is made greater; and a cam switching device configured to switch, between a first cam and a second cam that is selected to achieve a charging efficiency of intake air higher than that achieved with the first cam, a cam that drives a valve that opens and closes a combustion chamber.

The control device is configured to:

where a designated cam switching condition that a cam switching operation from the first cam to the second cam is performed in response to an increase of a required engine torque during use of a high-load region where a throttle-downstream pressure is higher than an atmospheric air pressure is met, execute a boost pressure control processing using the boost pressure control device and an air amount control processing using the throttle valve;

in the boost pressure control processing, control the boost pressure control device such that the boost pressure control parameter does not increase in synchronization with execution of the cam switching operation and decreases in accordance with an increase of the required engine torque after the execution of the cam switching operation; and in the air amount control processing, control an opening degree of the throttle valve to its closed side in synchronization with the cam switching operation such that a difference of an in-cylinder charge air amount is not produced before and after the execution of the cam switching operation.

The control device may be configured, where the designated cam switching condition is met and it is required for the throttle-downstream pressure to be lowered to a designated value or lower in order not to produce the difference of the in-cylinder charge air amount before and after the execution of the cam switching operation, to execute the boost pressure control processing and the air amount control processing.

The designate value may be an atmospheric air pressure.

The control device may be configured, where a rate of increase of the required engine torque is higher than or equal to a threshold value when the designated cam switching condition is met, to execute the boost pressure control processing and the air amount control processing.

According to the control device for an internal combustion engine of the present disclosure, where the designated cam switching condition is met, the control device may be configured to execute the boost pressure control processing using the boost pressure control device and the air amount control processing using the throttle valve. According to the boost pressure control processing, the boost pressure control device is controlled such that the boost pressure control parameter does not increase in synchronization with execution of the cam switching operation and decreases in accordance with an increase of the required engine torque after the execution of the cam switching operation. Moreover, according to the air amount control processing, the opening degree of the throttle valve is controlled to its closed side in synchronization with the cam switching operation such that a difference of the in-cylinder charge air amount is not produced before and after the execution of the cam switching operation. Therefore, the difference of the in-cylinder charge air amount (torque difference) can be prevented from being produced before and after the execution of the cam switching operation, without decreasing the boost pressure (i.e., turbine rotational speed) after the execution of the cam switching operation. As a result, a transitional shortage of the engine torque due to a delay in the follow-up of the actual engine torque with respect to the required engine torque after the execution of the cam switching operation can be reduced while reducing the occurrence of a torque difference.

DETAILED DESCRIPTION

In the following, embodiments of the present disclosure will be described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

First Embodiment

Firstly, a first embodiment according to the present disclosure will be described with reference to FIGS. 1 to 6.

1-1. Example of Configuration of System

Figure 1:
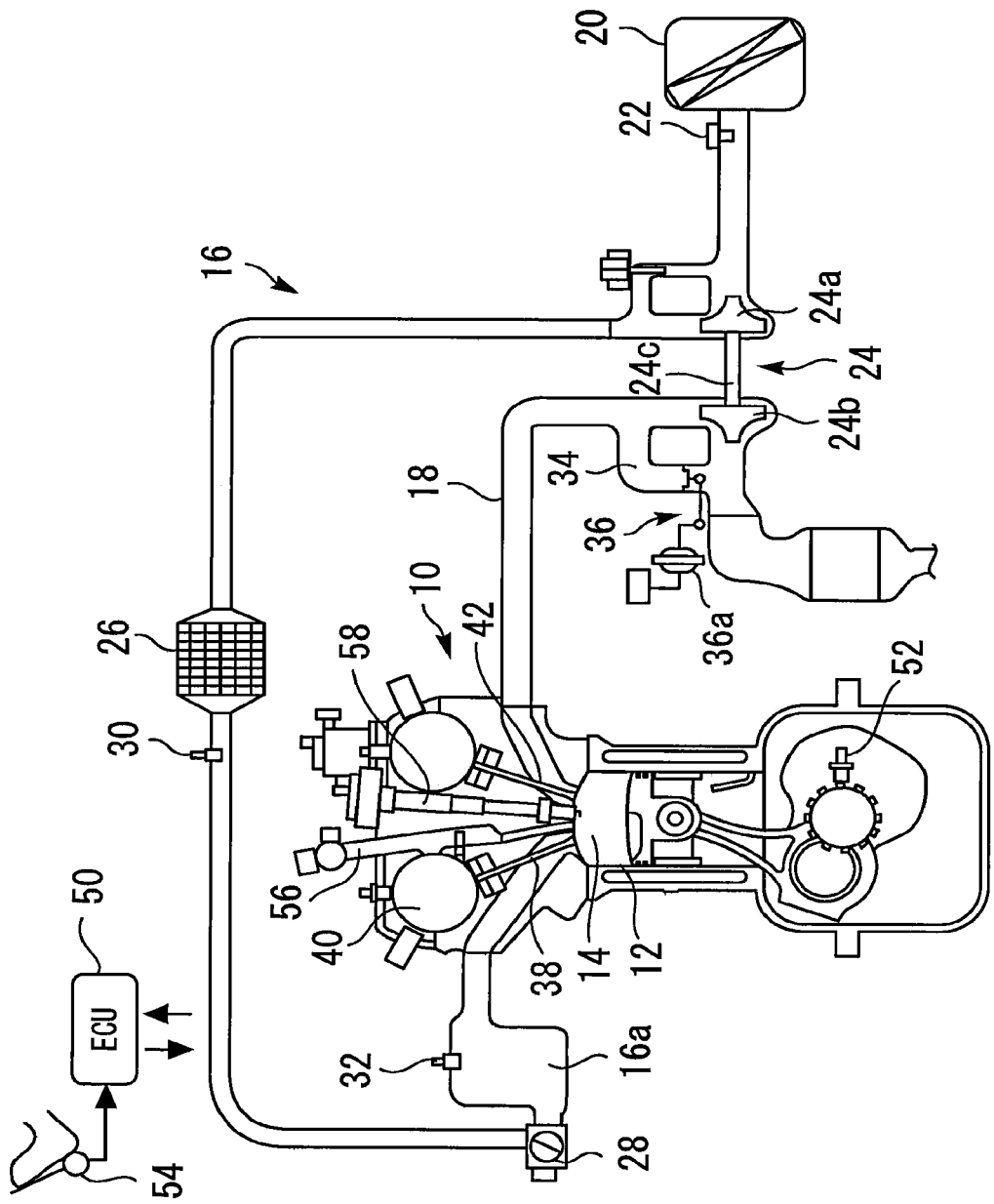
FIG. 1 is a schematic diagram for describing an example of the configuration of a system according to a first embodiment of the present disclosure.

FIG. 1 is a schematic diagram for describing an example of the configuration of a system according to the first embodiment of the present disclosure. The system according to the present embodiment includes an internal combustion engine (as an example, a spark-ignition type gasoline engine) 10. Inside each of cylinders 12 of the internal combustion engine 10, a combustion chamber 14 is formed. The number and arrangement of cylinders of the internal combustion engine 10 are not particularly limited. An intake air passage 16 and an exhaust gas passage 18 communicate with each cylinder 12.

An air cleaner 20 is provided in the vicinity of an inlet of the intake air passage 16. An air flow sensor 22 that outputs a signal responsive to the flow rate of the air (intake air) taken into the intake air passage 16 is arranged downstream of the air cleaner 20. Also, a compressor 24a of a turbocharger 24 is arranged in a portion of the intake air passage 16 located on the downstream side of the air flow sensor 22. The turbocharger 24 is equipped with a turbine 24b that is arranged in the exhaust gas passage 18. The compressor 24a is integrally coupled to the turbine 24b by a coupling shaft 24c, and is driven to rotate by the exhaust energy of exhaust gas supplied to the turbine 24b.

An intercooler 26, which cools the intake air compressed by the compressor 24a, is installed in a portion of the intake air passage 16 located on the downstream side of the compressor 24a. An electronically-controlled throttle valve 28 is installed in a portion of the intake air passage 16 located on the downstream side of the intercooler 26. An intake air pressure sensor 30 is installed in a portion of the intake air passage 16 located on the upstream side of the throttle valve 28 and the downstream side of the compressor 24a. The intake air pressure sensor 30 outputs a signal responsive to the outlet pressure of the compressor 24a, that is, a boost pressure of the turbocharger 24 (hereunder, also referred to as a "throttle-upstream pressure").

An intake manifold 16a for distributing the intake air into each cylinder 12 is provided on the downstream side of the throttle valve 28. Passages in the intake manifold 16a serve as a part of the intake air passage 16. An intake air pressure sensor 32 is installed in a connecting portion (surge tank) of the intake manifold 16a. The intake air pressure sensor 32 outputs a signal responsive to an intake manifold pressure (hereunder, also referred to as a "throttle downstream pressure").

An exhaust bypass passage 34 that bypasses the turbine 24b is connected to the exhaust gas passage 18. A waste gate valve (WGV) 36 that opens and closes the exhaust bypass passage 34 is arranged in the exhaust bypass passage 34. As an example, the WGV 36 is driven by a diaphragm type vacuum regulating valve (VRV) 36*a*. The WGV 36 is configured such that its opening degree (WGV opening degree) can be adjusted within a predetermined opening-degree control range. The boost pressure can be controlled by changing the WGV opening degree to adjust the amount of the exhaust energy that is recovered by the turbine 24*b* (i.e., the flow rate of the exhaust gas that passes through the turbine 24*b*).

It should be noted that these exhaust bypass passage 34 and the WGV 36 correspond to an example of the "boost pressure control device" according to the present disclosure. In addition, the WGV opening degree corresponds to an example of the "boost pressure control parameter" according to the present disclosure. In more detail, the smaller the WGV opening degree (i.e., boost pressure control parameter) is, the greater the amount of the exhaust energy recovered by the turbine 24*b* becomes.

Intake valves 38 are provided at an end portion of the intake air passage 16 located on the side closer to the combustion chamber 14. The intake valves 38 are driven by an intake variable valve operating device including a cam switching device 40. The cam switching device 40 is configured to be able to selectively switch, between a first cam and a second cam, a cam that drives the intake valves 38 (hereunder, referred to as a "valve drive cam"). It should be noted that the cam switching device 40 can also be provided in order to switch cams for driving exhaust valves 42.

As the cam switching device 40 described above, a known device for switching the valve drive cam can be used, for example, by shifting the first cam and the second cam in the axial direction of a camshaft. In addition, as another example of the cam switching device 40, a known device for switching the valve drive cam can be used by switching the state of connection of a plurality of rocker arms that are interposed between the first and second cams and the intake valve 38, by the use of, for example, a switching pin. According to the cam switching device 40 exemplified in this way, the valve drive cam can be promptly switched in response to a cam switching request.

Figure 2:
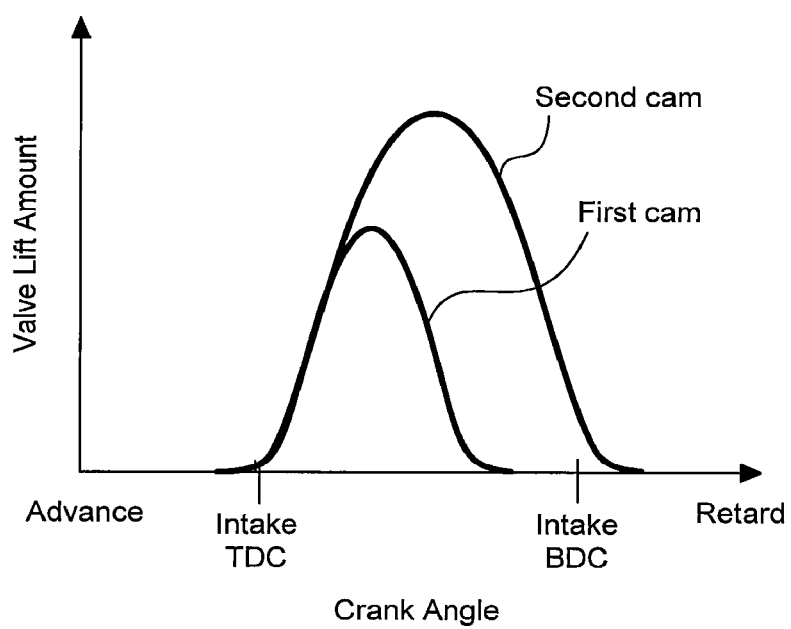
FIG. 2 shows valve lift curves for describing an example of the profiles of first and second cams.

FIG. 2 shows valve lift curves for describing an example of the profiles of the first and second cams. The second cam is formed such that the charging efficiency of the intake air that is higher than that of the first cam is achieved in an engine operating condition in which the second cam is used. In order to achieve this kind of characteristics, in an example shown in FIG. 2, the second cam is formed so as to be able to achieve the lift amount and operating angle of the intake valve 38 that are higher than those achieved when the first cam is used.

As shown in FIG. 1, the system according to the present embodiment further includes an electronic control unit (ECU) 50. Various sensors installed in the internal combustion engine 10 and the vehicle on which it is mounted and various actuators for controlling the operation of the internal combustion engine 10 are electrically connected to the ECU 50.

The various sensors described above include a crank angle sensor 52 and an accelerator position sensor 54, in addition to the air flow sensor 22 and the intake air pressure sensors 30 and 32 that are described. The crank angle sensor 52 outputs a signal responsive to the crank angle. The ECU 50 can calculates an engine speed Ne by the use of the signals of the crank angle sensor 52. The accelerator position sensor 54 outputs a signal responsive to a depression amount of an accelerator pedal of the vehicle (i.e., accelerator position). In addition, the various actuators described above include fuel injection valves 56 and an ignition device 58, in addition to the throttle valve 28 and the WGV 36 that are described above.

The ECU 50 includes a processor, a memory, and an input/output interface. The input/output interface receives sensor signals from the various sensors described above, and also outputs actuating signals to the various actuators described above. In the memory, various control programs and maps for controlling the various actuators are stored. The processor reads out a control program from the memory and executes the control program. As a result, functions of the "control device for an internal combustion engine" according to the present embodiment are achieved.

1-2. Engine Control According to First Embodiment

1-2-1. Base Operation of Air Amount Control According to Internal Combustion Engine The ECU 50 executes an air amount control in order to control an engine torque. This air amount control corresponds to a control of an in-cylinder charge air amount that is the amount of the air charged into each cylinder 12 of the internal combustion engine 10, and is performed by the use of the throttle valve 28 and the WGV 36. Hereunder, an example of this kind of air amount control will be described with reference to FIG. 3.

Figure 3:
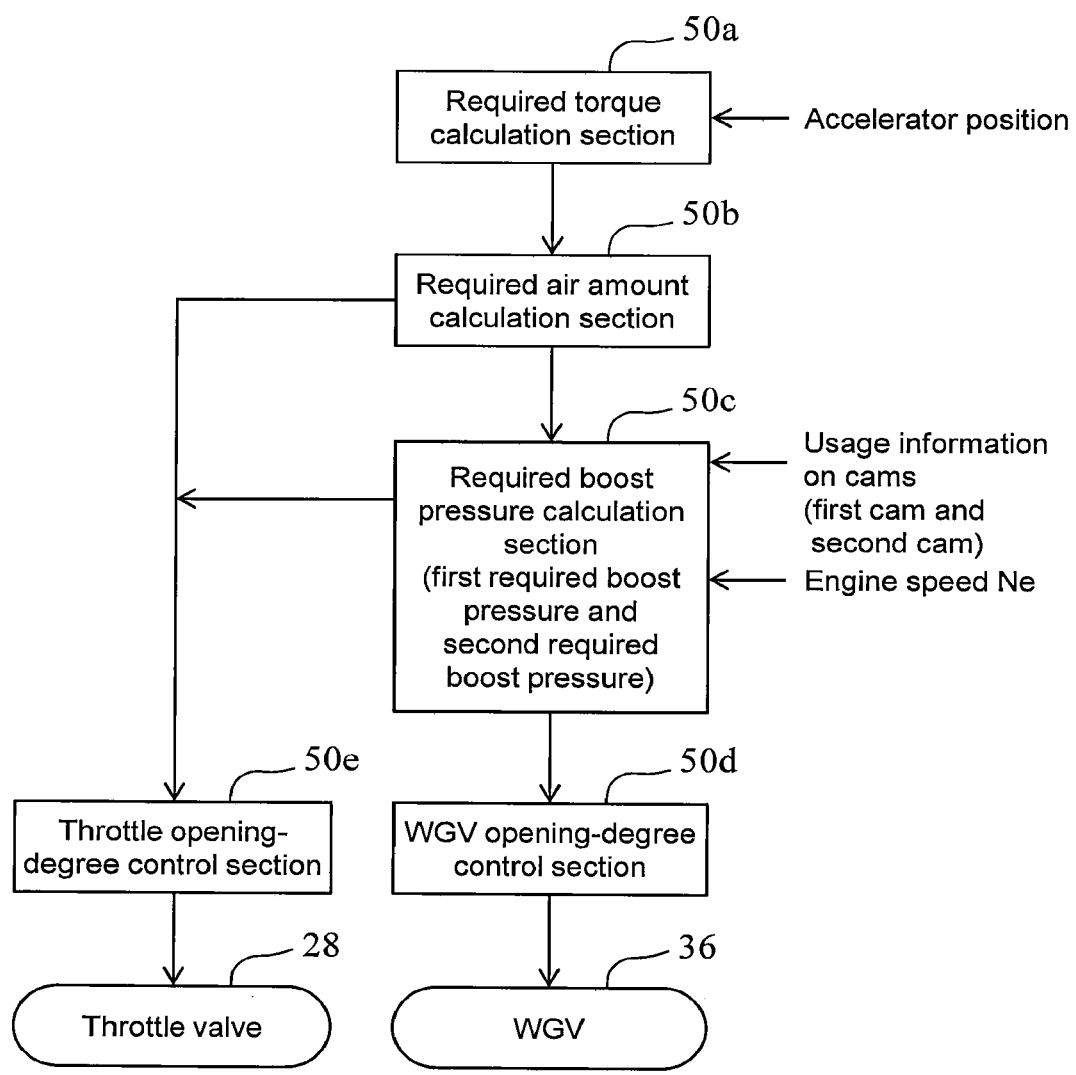
FIG. 3 is a block diagram that illustrates an example of the configuration of an ECU for the air amount control used in the first embodiment of the present disclosure.

FIG. 3 is a block diagram that illustrates an example of the configuration of the ECU 50 for the air amount control used in the first embodiment of the present disclosure. As shown in FIG. 3, the ECU 50 includes, as its functional blocks that relate to the air amount control, a required torque calculation section 50*a*, a required air amount calculation section 50*b*, a required boost pressure calculation section 50*c*, a WGV opening-degree control section 50*d* and a throttle opening-degree control section 50*e*.

The required torque calculation section 50*a* calculates a required engine torque from a driver of the vehicle (hereunder, simply abbreviated to as a "require torque") depending on the accelerator position. A calculated required torque is outputted to the required air amount calculation section 50*b*.

The required air amount calculation section 50*b* calculates a required air amount that is an in-cylinder charge air amount required to achieve the required torque. In order to calculate this required air amount, the required air amount calculation section 50*b* uses, for example, an air amount map that defines a relationship between the required torque and the required air amount. A calculated required air amount is outputted to the required boost pressure calculation section 50*c* and the throttle opening-degree control section 50*e*. In addition, it is supposed that, as a premise of the calculation of the required air amount, a stoichiometric air-fuel ratio is used as an example of a target air-fuel ratio and that a spark timing is controlled to an optimal spark timing (for example, a more retarded ignition timing of MBT (Minimum Advance for Best Torque) ignition timing and trace knock ignition timing).

The required boost pressure calculation section 50*c* calculates a required boost pressure that is a boost pressure (i.e., throttle-upstream pressure) required to achieve the required air amount. Usage information on cams (i.e., information that indicates which of the first cam and the second cam is used for driving the intake valve 38) and the engine speed Ne are inputted to the required boost pressure calculation section 50*c* as well as the required air amount. That is to say, the required boost pressure is calculated so as to have a value that is different depending on which of the first cam and the second cam is used.

To be more specific, in order to calculate the required boost pressure, the ECU 50 stores, for each cam, a boost pressure map that defines a relationship between the required air amount and engine speed Ne, and the required boost pressure. When the first cam is used, the required boost pressure calculation section 50c calculates the required boost pressure required to satisfy a required air amount under the first cam and the current engine speed Ne (for ease of explanation, also referred as to a "first required boost pressure"). On the other hand, when the second cam is used, the required boost pressure calculation section 50c calculates a "second required boost pressure" in a similar way. A calculated required boost pressure (i.e., first boost pressure or second boost pressure) is outputted to the WGV opening-degree control section 50d and the throttle opening-degree control section 50e.

The WGV opening-degree control section 50d calculates a required diaphragm negative pressure in order to control the WGV 36 such that a WGV opening degree required to achieve the required boost pressure is achieved. The greater the flow rate of the gas that passes through the turbine 24b (i.e., turbine flow rate) is, the higher the supercharging ability of the turbocharger 24 becomes. Because of this, in order to calculate the required diaphragm negative pressure, the WGV opening-degree control section 50d uses, for example, a map that defines a relationship between the required boost pressure and turbine flow rate, and the required diaphragm negative pressure. The turbine flow rate can be, for example, obtained by substituting therefor the intake air flow rate detected by the air flow sensor 22.

Furthermore, the WGV opening-degree control section 50d calculates an electric current value of the VRV 36a (VRV instruction current) required to achieve the required diaphragm negative pressure. In order to calculate this VRV instruction current, the WGV opening-degree control section 50d uses, for example, a map that defines a relationship between the required diaphragm negative pressure and the VRV instruction current. A calculated VRV instruction current is instructed to the WGV 36 (VRV 36a). Thus, the WGV 36 is controlled so as to have a WGV opening degree that satisfies the required boost pressure.

The throttle opening-degree control section 50e calculates a throttle instruction current in order to control the throttle valve 28 such that a throttle opening degree required to achieve the required air amount under the required boost pressure (i.e., required value of the throttle-upstream pressure) that is satisfied by the control of the WGV 36 is achieved. In order to calculate this instruction current, the throttle opening-degree control section 50e uses, for example, a map that defines a relationship between the required air amount and required boost pressure, and the throttle instruction current. A calculated throttle instruction current is instructed to the throttle valve 28. Thus, the throttle valve 28 is controlled so as to have a throttle opening degree that satisfies the required air amount.

1-2-1-1. Example in which Required Throttle-Downstream Pressure is Lower than or Equal to Atmospheric Air Pressure According to the required boost pressure calculation section 50c described above, when supercharging is not required to achieve the required air amount (that is, when the throttle-downstream pressure required to achieve the required air amount is lower than or equal to the atmospheric air pressure), the atmospheric air pressure is calculated as the required boost pressure.

When the required boost pressure is the atmospheric air pressure, the WGV opening-degree control section 50d controls the WGV 36 such that a maximum opening degree within the predetermined opening-degree control range described above is achieved. This maximum opening degree is equal to or greater than a minimum saturation opening degree of the flow rate (bypass flow rate) of the gas that bypasses the turbine 24b (that is, minimum opening degree at which the bypass flow rate does not further increase even when the WGV 36) further opens. According to the present embodiment, a full open degree is used as an example of this kind of maximum opening degree.

The throttle opening-degree control section 50e controls the throttle valve 28 such that a throttle opening degree for achieving the required air amount is achieved when the WGV 36 is controlled to the maximum opening degree (i.e., full open degree) as described above.

1-2-1-2. Example in which Required Throttle-Downstream Pressure is Higher than Atmospheric Air Pressure On the other hand, when supercharging is required (that is, when the throttle-downstream pressure required to achieve the required air amount is higher than the atmospheric air pressure), a value higher than the atmospheric air pressure is calculated as the required boost pressure.

When a value higher than the atmospheric air pressure is calculated as the required boost pressure, the throttle opening-degree control section 50e controls the throttle valve 28 such that the full open degree is achieved. If the throttle opening degree is the full open degree, the boost pressure (i.e., throttle-upstream pressure) and the throttle-downstream pressure become (substantially) equal to each other. The WGV opening-degree control section 50d controls the WGV 36 so as to have a WGV opening degree that is required to achieve the required boost pressure satisfying the required air amount (i.e., required value of throttle-downstream pressure) while the throttle valve 28 is open at the full open degree. In more detail, the WGV opening degree is controlled so as to be smaller when the required boost pressure is higher, provided that the WGV opening degree is smaller than the minimum saturation opening degree described above.

It should be noted that the calculation of various parameters, such as the required air amount and the required boost pressure, used in the air amount control described above may be performed by the use of, for example, calculation formulas based on a known physics model, instead of the example of the maps described above being used.

1-2-2. Problem on Air Amount Control Executed when Designated Cam Switching Condition is Met With the cam switching device 40 described above, the ECU 50 can switch a cam that drives the intake valve 38 from the first cam to the second cam, and can also switch it from the second cam to the first cam.

On that basis, during use of a high-load region in which the throttle-downstream pressure is higher than the atmospheric air pressure, a condition that a cam switching operation from the first cam to the second cam (that is, operation to switch to a cam that can achieve a higher charging efficiency) is performed as a result of an increase of the required torque may be met. Hereunder, this condition is referred to as a "designated cam switching condition" for ease of explanation.

Figure 4:
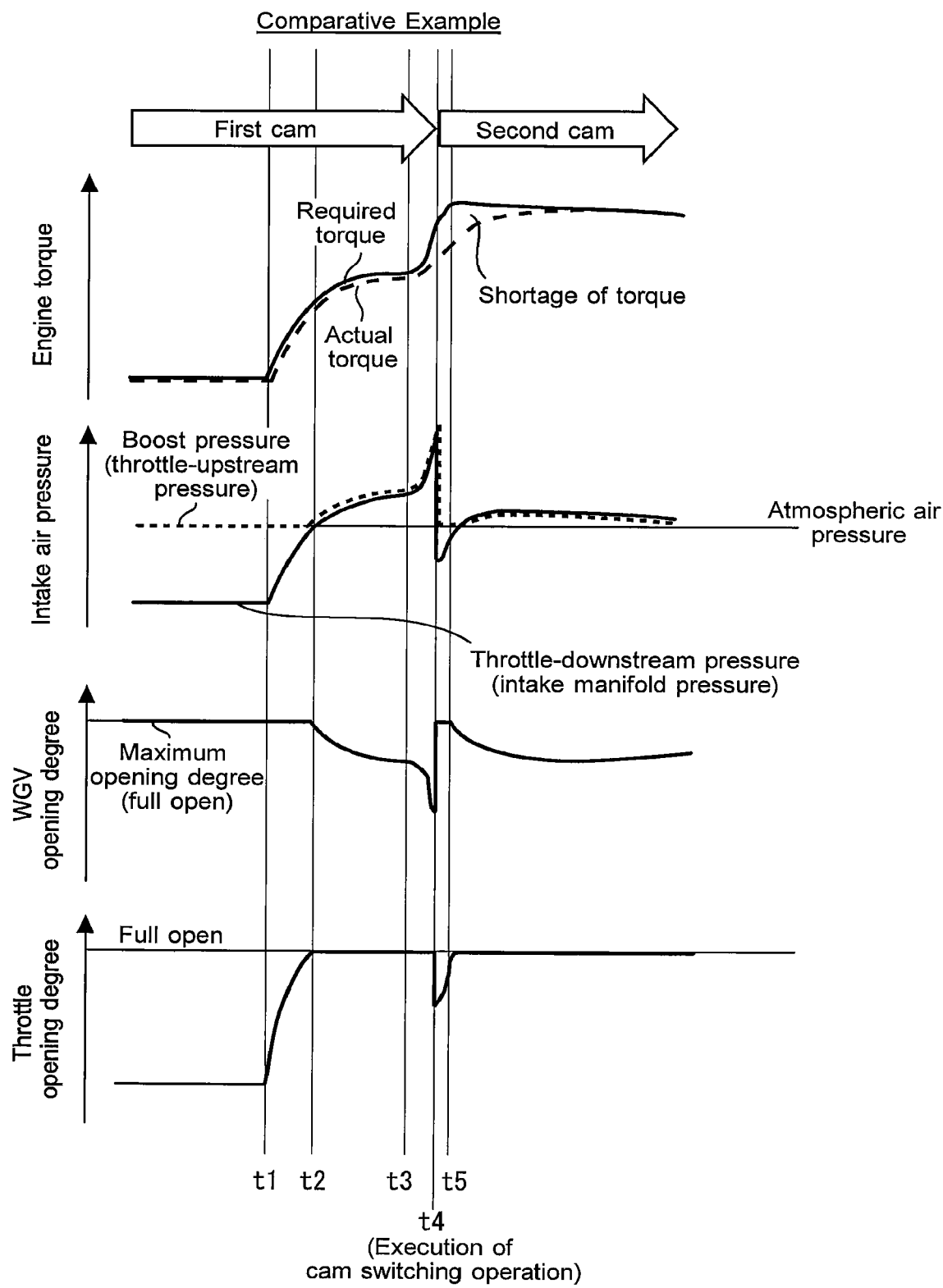
FIG. 4 is a time chart that illustrates a comparative example of an air amount control (i.e., torque control) referred to for explaining a problem on the air amount control executed when a designated cam switching condition is met.

FIG. 4 is a time chart that illustrates a comparative example of an air amount control (i.e., torque control) referred to for explaining a problem on the air amount control executed when the designated cam switching condition is met. In addition, it is supposed that an internal combustion engine that is applied to this comparative example has a hardware configuration similar to that of the internal combustion engine 10 shown in FIG. 1.

A time point t1 in FIG. 4 corresponds to a time point at which depression of the accelerator pedal by the driver of the vehicle is performed (that is, a time point at which a request to increase the engine torque (i.e., engine load) is made) during use of a low-load region in which the throttle-downstream pressure becomes lower than or equal to the atmospheric air pressure. A typical example of the time of this kind of request to increase the engine torque being made is the time of an acceleration request being made, and another example thereof is the time of climbing.

Although the waveform of the in-cylinder charge air amount (in detail, actual in-cylinder charge air amount) is not shown in FIG. 4 (also in FIG. 5 described later), it is similar to the waveform of actual torque (broken line). After the time point t1 elapses, the throttle valve is opened as a result of an increase of the required torque (solid line) while the WGV opening degree is maintained at the maximum opening degree (full open degree). Since the WGV opening degree is maintained at the maximum opening degree, the boost pressure (in detail, actual boost pressure) is maintained at a value equivalent to the atmospheric air pressure. On the other hand, the throttle-downstream pressure (intake manifold pressure) becomes greater associated with an increase of the throttle opening degree. As a result, since the actual in-cylinder charge air amount becomes greater, the actual torque also becomes greater.

A time point t2 corresponds to a time point at which the throttle opening degree reaches the full open degree and thus the throttle-downstream pressure reaches the atmospheric air pressure. According to the comparative example shown in FIG. 4, an engine torque that is higher than a value that can be generated when the WGV opening degree is the maximum opening degree and the throttle opening degree is the full open degree is requested. Because of this, after the time point t2 elapses, the WGV is closed while the throttle valve is fully open. As a result, since the throttle opening degree is the full open degree, the boost pressure (throttle-upstream pressure) and the throttle-downstream pressure, which are substantially equal to each other, become higher in association with a decrease of the WGV opening degree. As a result of this, since the actual in-cylinder charge air amount further becomes greater, the actual torque further becomes greater. Then, the engine operating region transitions to a high-load region in which the throttle-downstream pressure is higher than the atmospheric air pressure.

According to the comparative example, at a time point t3 after the time point t2 elapses, the required torque starts to further increase due to the fact that the accelerator pedal is further depressed by the driver. In addition, according to this example, a cam switching request to switch the valve drive cam from the first cam to the second cam after elapse of the time point t3 is made, and, as a result, the cam switching operation based on this cam switching request is executed (i.e., the switching from the first cam to the second cam is performed) at a time point t4.

According to the comparative example shown in FIG. 4, the designated cam switching condition described above is met at the time point t4. There is the following problem on the air amount control that should be performed when this kind of designated cam switching condition is met.

According to the comparative example shown in FIG. 4, the WGV is controlled as follows in order to reduce a torque difference due to the occurrence of a difference of the in-cylinder charge air amount before and after execution of the cam switching operation to the second cam by which a higher charging efficiency is achieved. That is to say, the WGV is once opened at the time point t4 of the execution of the cam switching operation during an increase of the required torque. As a result of this, the throttle-downstream pressure decreases in association with a decrease of the boost pressure. Thus, an increase of the in-cylinder charge air amount associated with the switching to the second cam is reduced. The torque difference can therefore be reduced.

However, if the WGV is once opened during an increase of the required torque as described above, the turbine rotational speed decreases. Because of this, there is a concern that, when the actual in-cylinder charge air amount (i.e., actual torque) is increased in response to an increase of the required torque thereafter (at or after a time point t5) while the actual boost pressure is increased, a turbo lag may occur. If the turbo lag occurs, as shown in FIG. 4, a delay in the follow-up the actual torque with respect to the required torque may occur and a shortage of the actual torque may occur.

In particular, the comparative example shown in FIG. 4 corresponds to an example in which, where the designated cam switching condition is met, a condition is met that it is required for the throttle-downstream pressure to be lowered to the atmospheric air pressure or lower in order not to produce a difference of the in-cylinder charge air amount before and after the execution of the cam switching operation (hereunder, referred to as an "additional condition" for ease of explanation). In the example in which the additional condition is also met in this way, the above-described problem of the shortage of the engine torque occurs more prominently, as described below.

That is to say, according to the comparative example shown in FIG. 4, the WGV is once opened to the maximum opening degree (i.e., full open degree) at the time point t4 in order to lower the boost pressure to the atmospheric air pressure. If the boost pressure is lowered to the atmospheric air pressure by largely opening the WGV in this way, the turbo lag becomes greater, and a delay in the follow-up of the actual torque with respect to the required torque thereafter occurs more prominently. Therefore, the above-described problem of shortage of the engine torque occurs more prominently. It should be noted that, according to the comparative example shown in FIG. 4, a control to once close the throttle opening degree is also performed in addition to the opening of the WGV due to the need of the throttle-downstream pressure being lowered than the atmospheric air pressure.

In addition, according to the comparative example shown in FIG. 4, after the cam switching operation (from the first cam to the second cam) is executed at the time point t4, firstly, the throttle valve 28 is opened to cause the actual torque to approach the required torque. Then, after the time point t5 at which the throttle opening degree has reached the full open degree again (that is, a time point at which the throttle-downstream pressure has reached the atmospheric air pressure), the WGV 36 is closed, under the throttle valve 28 being fully open, until the actual torque finishes the follow-up with respect to the required torque.

Figure 5:
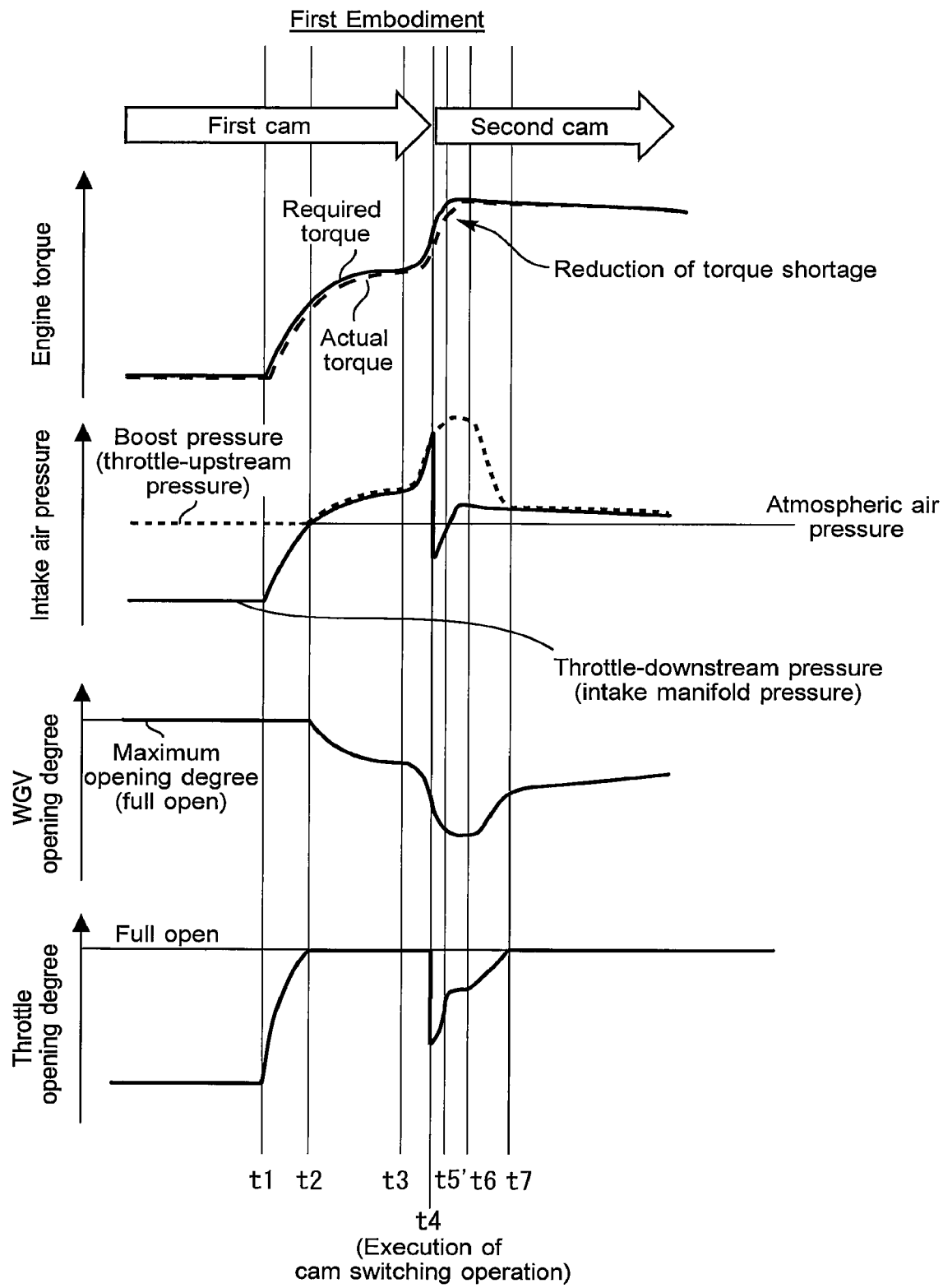
FIG. 5 is a time chart for describing the air amount control (torque control) executed when the designated cam switching condition is met in the first embodiment according to the present disclosure.

1-2-3. Outline of Air Amount Control According to First Embodiment Executed when Designated Cam Switching Condition is Met FIG. 5 is a time chart for describing the air amount control (torque control) executed when the designated cam switching condition is met in the first embodiment according to the present disclosure. FIG. 5 shows an example of control performed when the required torque increases in a similar way under the same condition (more specifically, the same environment condition and operating condition of the internal combustion engine 10) as that in the comparative example shown in FIG. 4. Therefore, the example shown in FIG. 5 also corresponds to an example in which the "additional condition" described above is also met when the designated cam switching condition is met.

As shown in FIG. 5, according to the air amount control of the present embodiment, a "boost pressure control processing" using the WGV 36 and a "air amount control processing" using the throttle valve 28 are executed (started) at the time point t4 at which the cam switching operation (from the first cam to the second cam) is performed under both the designated cam switching condition and the additional condition are met. As an example, the boost pressure control processing and the air amount control processing are executed until a time point t6. This time point t6 corresponds to a time point at which the actual torque reaches the required torque.

To be more specific, the boost pressure control processing is executed by the WGV opening-degree control section 50d, and the air amount control processing is executed by the throttle opening-degree control section 50e. According to the boost pressure control processing, as shown in FIG. 5, the WGV 36 is controlled such that the WGV opening degree does not become greater in synchronization with the execution of the cam switching operation (in more detail, simultaneously with the cam switching operation at the time point t4 in the example shown in FIG. 5). Moreover, according to the boost pressure control processing, the WGV 36 is controlled such that the WGV opening degree becomes smaller in response to an increase of the required torque after the time point t4 elapses (i.e., after the execution of the cam switching operation). As an example, this kind of control of the WGV opening degree can be achieved by using, in the following manner, the required torque calculated by the required boost pressure calculation section 50c.

As already described, the ECU 50 includes, for each cam, the boost pressure map for calculating the required boost pressure. Because of this, if the switching from the first cam to the second cam is performed, a second required boost pressure associated with the second cam is supposed to be used instead of a first required boost pressure associated with the first cam. However, according to the boost pressure control processing, even after the time point t4 reaches, the first required boost pressure is continuously used without changing the boost pressure map.

The switching from the first cam to the second cam is performed to achieve a higher charging efficiency. Because of this, in an engine operating condition that the second cam is used, the first required boost pressure becomes higher than the second required boost pressure when compared under the condition of the same required air amount and engine speed Ne. Therefore, during the time period (t4-t6) of execution of the boost pressure control processing in which the first required boost pressure is continuously used, although the valve drive cam has been actually switched to the second cam, the first required boost pressure that is higher than the second required boost pressure associated with the second cam is used.

As a result, the WGV 36 can be controlled such that the WGV opening degree does not become greater in synchronization with the execution of the cam switching operation and also becomes smaller in response to an increase of the required torque after the time point t4 elapses.

On the other hand, in the air amount control processing, the throttle opening-degree control section 50e controls the throttle opening degree in synchronization with the cam switching operation (in more detail, simultaneously with the cam switching operation at the time point t4 in the example shown in FIG. 5) such that the difference of the in-cylinder charge air amount is not caused to occur before and after the execution of the cam switching operation associated with the execution of the boost pressure control processing. More specifically, according to the example shown in FIG. 5, contrary to the comparative example shown in FIG. 4, the WGV opening degree is not increased in the vicinity of the time point t4 at which the switching from the first cam to the second cam is performed. Thus, the processing to maintain the same in-cylinder charge air amount before and after the switching to the second cam is executed by only controlling the throttle opening degree to the closed side.

Moreover, during a time period from the time point t4 to a time point t5' (which is a time point at which the throttle-downstream pressure reaches the atmospheric air pressure), the WGV opening degree is decreased in response to an increase of the required torque. The throttle opening degree during this time period is increased in response to an increase of the required torque in order to achieve the required in-cylinder charge air amount (required torque) in cooperation with a decrease of the WGV opening degree.

Furthermore, if the boost pressure control processing and the throttle control processing are ended at a time point t6 at which the delay in the follow-up of the actual torque with respect to the required torque is eliminated, the continuous use of the first required boost pressure is ended, and the second required boost pressure associated with the second cam which is currently in use is normally used for the air amount control As a result, since the required boost pressure becomes lower, as shown in FIG. 5, the WGV opening degree is increased (with a lapse of time) in order to achieve the second required boost pressure. In addition, the throttle opening degree is increased in order to maintain the required in-cylinder charge air amount (required torque) under the WGV opening degree increasing in this way. As a result of this, the boost pressure (actual boost pressure) approaches the throttle-downstream pressure. A time point t7 corresponds to a time point at which the actual boost pressure has reached the second required boost pressure.

1-2-4. Advantageous Effects Concerning Air Amount Control

As described so far, the air amount control according to the present embodiment includes the boost pressure control processing and the air amount control processing that are executed when the designated cam switching condition is met. According to these processing, the boost pressure can be highly maintained in the time period (t4-t5') in FIG. 5, that is, in the time period in which the throttle-downstream pressure is lower than or equal to the atmospheric air pressure, as compared to the time period (t4-t5) in the comparative example shown in FIG. 4. In other words, the difference of the in-cylinder charge air amount (torque difference) can be prevented from being produced before and after the execution of the cam switching operation, without decreasing the boost pressure (i.e., turbine rotational speed). Thus, since the turbo lag can be reduced, as shown in FIG. 5, the throttle-downstream pressure can be caused to quickly increase in the course of the WGV opening degree being decreased in response to an increase of the required torque immediately after the elapse of the time point t5'. As a result, as shown in FIG. 5, a transitional shortage of the engine torque due to the delay in the follow-up of the actual torque with respect to the required torque after the execution of the cam switching operation can be effectively reduced while reducing the occurrence of a torque difference.

1-2-5. Processing of ECU Concerning Air Amount Control

Figure 6:
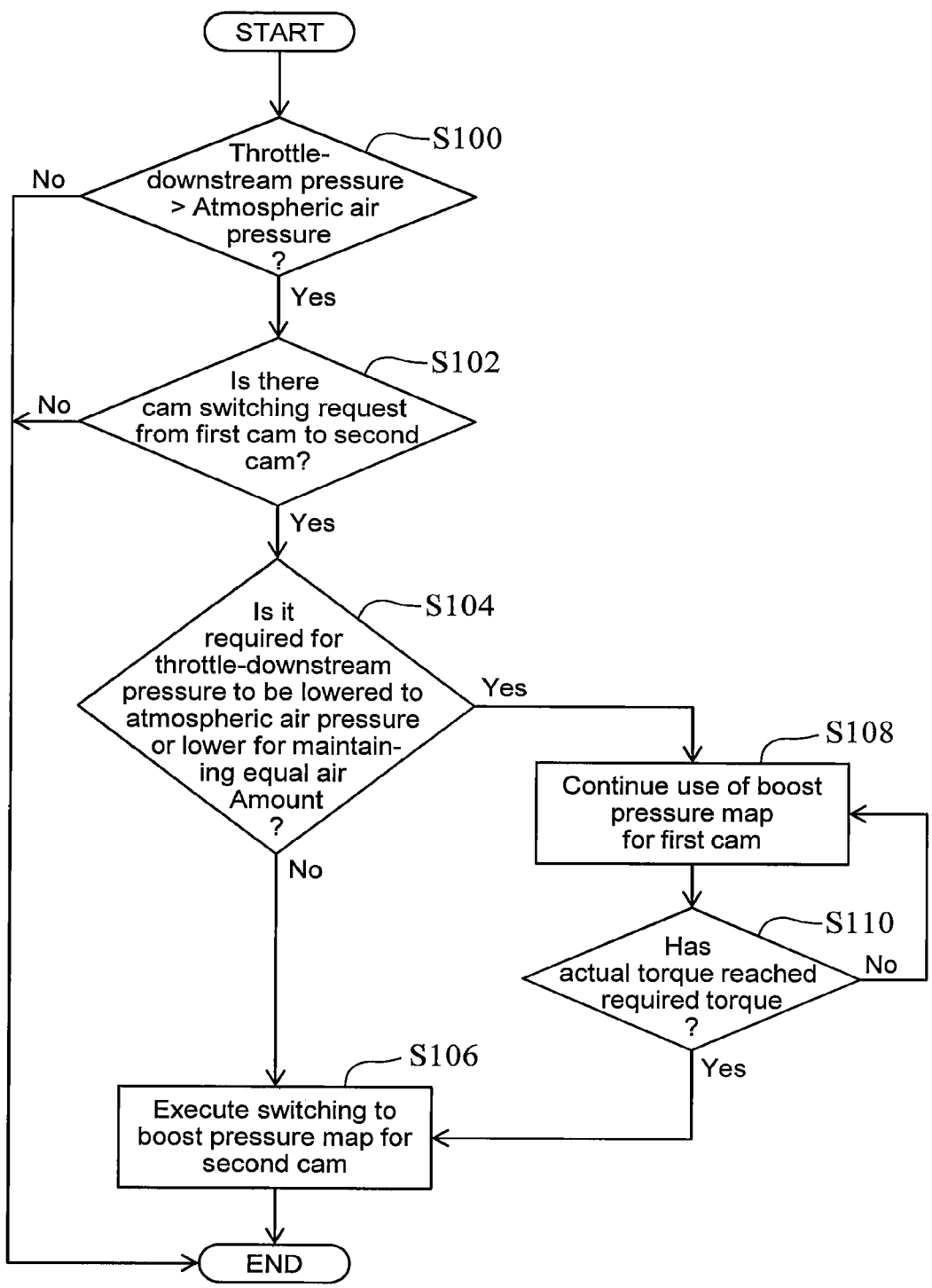
FIG. 6 is a flow chart that illustrates a routine of the processing concerning the air amount control according to the first embodiment of the present disclosure.

FIG. 6 is a flow chart that illustrates a routine of the processing concerning the air amount control according to the first embodiment of the present disclosure. The ECU 50 repeatedly executes the processing of the present routine during operation of the internal combustion engine 10.

According to the routine shown in FIG. 6, firstly, the ECU 50 determines whether or not the throttle-downstream pressure is higher than the atmospheric air pressure (step S100). The throttle-downstream pressure is obtained by the use of the intake air pressure sensor 32, for example. The atmospheric air pressure may be, for example, a fixed value, or be obtained by the use of an atmospheric air pressure sensor.

If the determination result of step S100 is negative, the ECU 50 ends the current processing cycle. If, on the other hand, the ECU 50 determines in step S100 that the high-load operating region in which the throttle-downstream pressure is higher than the atmospheric air pressure is in use, it proceeds to step S102.

In step S102, the ECU 50 determines whether or not there is a cam switching request from the first cam to the second cam. As an example, the first cam is used in an engine operating region located on the low-speed and low-load region, and the second cam is used in an engine operating region located on the higher-speed and higher-load side than the engine operating region in which the first cam is used. The cam switching request from the first cam to the second cam is, for example, made when the current engine operating point that is identified by the engine torque (engine load) and the engine speed Ne enters into the engine operating region in which the second cam is used. The cam switching request described above is also, for example, made when the rate of increase of the required torque becomes higher than or equal to a predetermined value during use of the first cam. In addition, the cam switching operation at the time point t4 in the example shown in FIG. 5 is based on an issuance of the latter cam switching request.

It should be noted that, with regard to the determination processing of step S102, the engine torque (actual torque) can be calculated, by the use of, for example, a torque map that is a reverse map with respect to the air amount map described above, as an estimated torque depending on the actual in-cylinder charge air amount. The calculation of the actual in-cylinder charge air amount can be performed by the use of, for example, a known physics model for the intake system.

If the determination result of step S102 is negative, the ECU 50 ends the current processing cycle. If, on the other hand, the determination result of step S102 is positive, that is, if it can be judged that the "designated cam switching condition" described above is met, the ECU 50 proceeds to step S104.

In step S104, with regard to the cam switching operation based on the cam switching request determined in step S102, the ECU 50 determines whether or not it is required for the throttle-downstream pressure to be lowered to the atmospheric air pressure or lower in order not to produce the difference of the in-cylinder charge air amount before and after the execution of the cam switching operation. In other words, it is determined whether or not the "additional condition" described above is met.

If the determination result of step S104 is negative, the ECU 50 executes switching of boost pressure map used for the calculation of the required boost pressure to the boost pressure map for calculating the second required boost pressure associated with the second cam (step S106). As a result, the control of the WGV 36 and throttle valve 28 based on the second required boost pressure is executed.

If, on the other hand, the determination result of step S104 is positive, that is, if it can be judged that the additional condition is also met as well as the designated cam switching request, the ECU 50 proceeds to step S108. In step S108, the ECU 50 continuously uses the boost pressure map used before the execution of the cam switching operation described above (that is, the boost pressure map for the calculation of the first required boost pressure associated with the first cam). As a result, the control of the WGV 36 and throttle valve 28 based on the first required boost pressure is executed.

Next, the ECU 50 determines whether or not the actual torque (i.e., estimated torque) has reached the required torque (step S110). While the determination result of step S110 is negative, the ECU 50 returns to step S108 to continue the use of the boost pressure map for the first cam. If, on the other hand, the determination result of step S110 becomes positive, the ECU 50 proceeds to step S106 to execute the switching of boost pressure map to the boost pressure map for the second cam.

Second Embodiment

Next, a second embodiment according to the present disclosure will be described with reference to FIG. 7. In the following description, it is supposed that the configuration shown in FIG. 1 is used as an example of a system configuration according to the second embodiment.

2. Engine Control According to Second Embodiment

The engine control according to the present embodiment is different from the engine control according to the first embodiment described above in terms of the execution condition of the boost pressure control processing and the air amount control processing.

More specifically, in the first embodiment, the boost pressure control processing and the air amount control processing are always executed when the designated cam switching condition and the additional condition are both met. In contrast to this, according to the present embodiment, even if the designated cam switching condition and the additional condition are both met, the boost pressure control processing and the air amount control processing are executed only when the rate of increase of the required torque is higher than or equal to a threshold value TH.

2-1. Processing of ECU Concerning Air Amount Control

Figure 7:
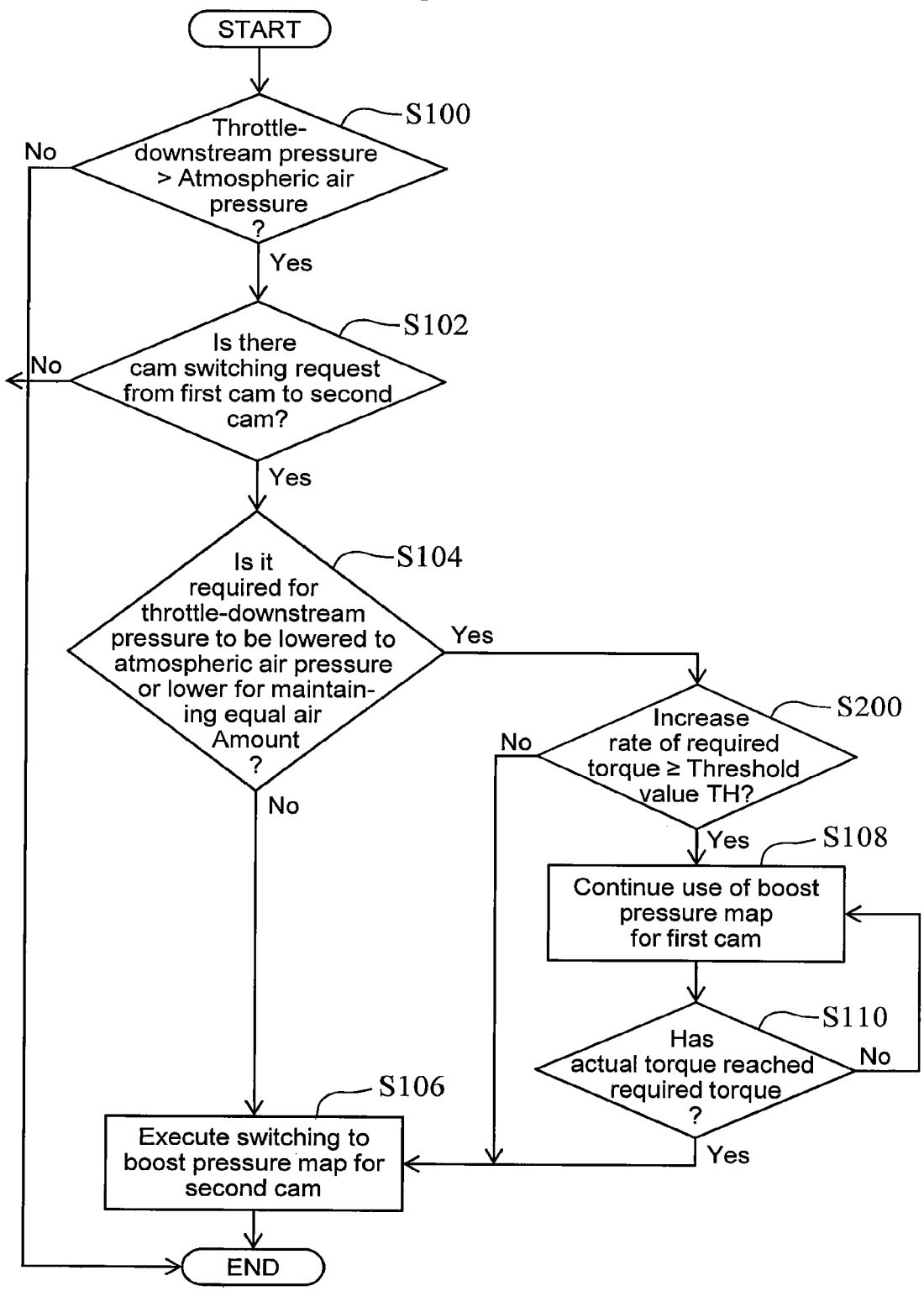
FIG. 7 is a flow chart that illustrates a routine of the processing concerning an air amount control according to a second embodiment of the present disclosure.

FIG. 7 is a flow chart that illustrates a routine of the processing concerning the air amount control according to the second embodiment of the present disclosure. The processing of steps S100 to S110 in the routine shown in FIG. 7 is as already described in the first embodiment.

According to the routine shown in FIG. 7, if the determination result of step S104 is positive (that is, if it can be judged that the designated cam switching condition and the additional condition are both met), the ECU 50 proceeds to step S200.

In step S200, the ECU 50 determines whether or not the rate of increase of the required torque is higher than or equal to the threshold value TH. This threshold value TH is set in advance as a value for determining the degree of a rapid increase request of the required torque (for example, rapid acceleration request) by the driver of the vehicle. It should be noted that the rate of increase of the required torque can be, for example, obtained on the basis of the rate of increase of the accelerator position.

If the determination result of step S200 is negative, that is, if it can be judged that the degree of the rapid increase request of the required torque by the driver is low, the ECU 50 proceeds to step S106. In other words, if the determination result is negative, the boost pressure control processing and the air amount control processing are not executed, contrary to the first embodiment.

If, on the other hand, the determination result of step S200 is positive, that is, if it can be judged that the degree of the rapid increase request of the required torque is high, the ECU 50 proceeds to step S108. Thus, if the determination result is positive, the boost pressure control processing and the air amount control processing are executed similarly to the first embodiment.

2-2. Advantageous Effects Concerning Air Amount Control

As described so far, the boost pressure control processing and the air amount control processing in the air amount control according to the present embodiment are not always executed when the designated cam switching condition and the additional condition are both met, but executed only when the rate of increase of the required torque is higher than or equal to the threshold value TH (that is, when the degree of the rapid increase request of the required torque by the driver is higher than a designated level).

According to the boost pressure control processing and the air amount control processing, the throttle-downstream pressure is lowered by the use of a decrease of the throttle opening degree in order not to produce the difference of the in-cylinder charge air amount without lowering the boost pressure immediately after the switching from the first cam to the second cam. If this kind of manner is used, the pumping loss becomes greater as compared to when a manner to lower the throttle-downstream pressure by lowering the boost pressure using an increase of the WGV opening degree is used. Thus, in terms of the fuel efficiency, it would be favorable that the opportunity of execution of the boost pressure control processing and the air amount control processing is reduced to the minimum necessary. In addition, it is conceivable that, where the rate of increase of the required torque is higher (for example, when the degree of the acceleration request is higher), the driver becomes easier to recognize (as an acceleration stagnation, for example) a delay in the follow-up of the actual torque due to the turbo lag.

With respect to the additional problem as described above, according to the air amount control of the present embodiment, the boost pressure control processing and the air amount control processing can be executed only under the condition where they are especially required in terms of satisfaction of a torque request by the driver. Therefore, a torque request by the driver can be effectively satisfied, using the boost pressure control processing and the air amount control processing, while the deterioration of the fuel efficiency described above due to the fact that the boost pressure is not lowered after the switching from the first cam to the second cam is minimally reduced.

Other Embodiments

3-1. Other Examples of Execution Condition of Boost Pressure Control Processing and Air Amount Control Processing According to the first and second embodiments described above, the boost pressure control processing and the air amount control processing are executed when all the results of three determinations in steps S100 to S104 become positive. That is to say, in the first and second embodiments, the boost pressure control processing and the air amount control processing are executed when not only the designated cam switching condition (steps S100 and S102) but also the additional condition (step S104) are met. However, instead of the example described above, the boost pressure control processing and the air amount control processing according to the present disclosure may alternatively be executed when the "additional condition" is not met and only the "designated cam switching condition" is met.

As already described in the first embodiment, if, when the "additional condition" is met, the WGV opening degree is increased to lower the boost pressure in order to lower the throttle-downstream pressure to the atmospheric air pressure or lower as in the comparative example shown in FIG. 4, the problem on the delay in the follow-up of the actual torque (i.e., transitional shortage of the engine torque) becomes more prominent due to the turbo lag. Thus, by using, as the execution condition of the boost pressure control processing and the air amount control processing, the additional condition in addition to the designated cam switching condition, the boost pressure control processing and the air amount control processing can be executed only under the condition where they are required especially in terms of reduction of the transitional shortage of the torque. Therefore, it would be favorable that, in terms of the fuel efficiency, the execution condition is set in this way.

However, if at least the designated cam switching condition is met, it is required to lower the throttle-downstream pressure in order not to produce the difference of the in-cylinder air amount before and after the execution of the cam switching operation. In addition, if the boost pressure is lowered by the use of a boost pressure control device to lower the throttle-downstream pressure, the problem on the delay in the follow-up of the actual torque with respect to the required torque may occur, although the degree of the problem may be different. Thus, only the designated cam switching condition may alternatively be used as the execution condition of the boost pressure control processing and the air amount control processing.

It should be noted that a concrete processing for an example in which only the designated cam switching condition is used as the execution condition can be, for example, obtained by the processing of a routine that is corrected such that step S104 is removed from the processing of the routine shown in FIG. 6 and the processing proceeds to step S108 when the determination result of step S102 becomes positive. In addition, the processing of step S200 (see FIG. 7) may alternatively be added to this kind of corrected routine such that, when the determination result of step S102 becomes positive, the processing of step S200 is executed prior to the processing of step S108.

Furthermore, a broader concept of the "additional condition" described above may be provided as follows. In other words, a condition that it is required for the throttle-downstream pressure to be lowered to a "predetermined value" or lower in order not to produce the difference of the in-cylinder charge air amount before and after the execution of the cam switching operation may be combined with the designated cam switching condition. In addition, this predetermined value may not always be the atmospheric air pressure as in the examples of the first and second embodiments, and may alternatively be a value higher than the atmospheric air pressure, for example.

3-2. Another Example of Boost Pressure Control Device

According to the first and second embodiments described above, the exhaust bypass passage 34 and the WGV 36 are taken as an example of the "boost pressure control device" for adjusting the amount of the exhaust energy recovered by the turbine 24b. However, another example of the "boost pressure control device" according to the present disclosure may be a variable nozzle device that makes variable the flow rate of the exhaust gas that flows into a turbine to adjust the amount of the exhaust energy recovered by the turbine. In the example of this variable nozzle device, a variable nozzle opening degree (VN opening degree) corresponds to an example of the "boost pressure control parameter", and, the smaller the VN opening degree (i.e., boost pressure control parameter) is, the greater the amount of the exhaust energy recovered by the turbine becomes. Thus, also in the example that uses the variable nozzle device, the "boost pressure control processing" can be executed in a similar way to those of the first and second embodiments using the WGV 36.

3-3. Another Example of Cam Switching Operation According to Designated Cam Switching Condition In the first and second embodiments described above, the cam switching operation according to the designated cam switching condition corresponds to an operation to switch the cam that drives the intake valve 38 from the first cam to the second cam. However, the charging efficiency of the intake air also changes depending on the switching of a cam that drives the exhaust valve 42 instead of or in addition to the switching of the cam that drives the intake valve 38. Thus, the "first cam" and the "second cam (that is, a cam that is selected to achieve a charging efficiency of intake air that is higher than the charging efficiency achieved with the first cam)" for the cam switching operation according to the "designated cam switching condition" according to the present disclosure may alternatively be a cam that drives at least one of an intake valve and an exhaust valve.

The embodiments and modification examples described above may be combined in other ways than those explicitly described above as required and may be modified in various ways without departing from the scope of the present disclosure.

What is claimed is:

1. A control device for an internal combustion engine, the internal combustion engine including:
    a turbocharger equipped with a compressor arranged in an intake air passage and a turbine arranged in an exhaust gas passage;
    a throttle valve arranged in a portion of the intake air passage located on an upstream side of the compressor;
    a boost pressure control device configured to control a boost pressure of the turbocharger by changing a boost pressure control parameter, a value of the boost pressure control parameter decreases when an amount of exhaust energy recovered by the turbine increases; and
    a cam switching device configured to switch, between a first cam and a second cam achieving a charging efficiency of intake air higher than that achieved with the first cam, a cam that drives a valve that opens and closes a combustion chamber,
    wherein the control device includes executable instructions stored in a non-transitory memory to:
    execute a boost pressure control processing using the boost pressure control device and an air amount control processing using the throttle valve when a designated cam switching condition that a cam switching operation from the first cam to the second cam is performed in response to an increase of a required engine torque during use of a high-load region in which a throttle-downstream pressure is higher than an atmospheric air pressure;
    during the boost pressure control processing, control the boost pressure control device such that the boost pressure control parameter does not increase in synchronization with an execution of the cam switching operation and decreases in accordance with an increase of the required engine torque after the execution of the cam switching operation; and
    during the air amount control processing, control an opening degree of the throttle valve to a closed side thereof in synchronization with the cam switching operation such that a difference of an in-cylinder charge air amount is not produced before and after the execution of the cam switching operation.

2. The control device according to claim 1, wherein the control device further includes executable instructions, during the boost pressure control processing and the air amount control processing, not the produce the difference of the in-cylinder charge air amount before and after the execution of the cam switching operation when the designated cam switching condition is met to reach a requirement of the throttle-downstream pressure being lowered than a designated value.

3. The control device according to claim 2, wherein the designated value for the requirement of the throttle-downstream pressure to be lowered than the atmospheric air pressure.

4. The control device according to claim 1, wherein the control device further includes executable instructions to, during the boost pressure control processing and the air amount control processing, increase a rate of the required engine torque being higher than or equal to a threshold value when the designated cam switching condition is met.

* * * * *